(12) United States Patent
Gaubil et al.

(10) Patent No.: US 8,309,482 B2
(45) Date of Patent: Nov. 13, 2012

(54) HIGH ZIRCONIA REFRACTORY MATERIAL

(75) Inventors: Michel Gaubil, Les Angles (FR); Ludovic Massard, Monteux (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 58 days.

(21) Appl. No.: 12/997,638

(22) PCT Filed: Jun. 16, 2009

(86) PCT No.: PCT/FR2009/051141
§ 371 (c)(1),
(2), (4) Date: Feb. 9, 2011

(87) PCT Pub. No.: WO2009/153517
PCT Pub. Date: Dec. 23, 2009

(65) Prior Publication Data
US 2011/0166008 A1    Jul. 7, 2011

(30) Foreign Application Priority Data
Jun. 16, 2008  (FR) ...................... 08 53967

(51) Int. Cl.
C04B 35/484   (2006.01)
(52) U.S. Cl. ......................... 501/105; 501/104
(58) Field of Classification Search ................. 501/104, 501/105
See application file for complete search history.

(56) References Cited

U.S. PATENT DOCUMENTS

| 5,023,218 | A | 6/1991 | Zanoli et al. |
| 5,086,020 | A | 2/1992 | Ishino et al. |
| 5,466,643 | A | 11/1995 | Ishino et al. |
| 5,679,612 | A | 10/1997 | Endo et al. |
| 2005/0159294 | A1 | 7/2005 | Boussant-Roux et al. |
| 2007/0249481 | A1 | 10/2007 | Gupta et al. |
| 2012/0036895 | A1* | 2/2012 | Sato ............ 65/374.13 |

FOREIGN PATENT DOCUMENTS

| EP | 0 403 387 A1 | 12/1990 |
| EP | 0 431 445 A1 | 6/1991 |
| FR | 1208577 | 7/1958 |
| FR | 75893 | 6/1959 |
| FR | 82310 | 4/1962 |
| FR | 2 701 022 A1 | 8/1994 |
| FR | 2 723 583 A1 | 2/1996 |
| JP | A-8-277162 | 10/1996 |
| JP | 10059768 | * 3/1998 |
| JP | 2000302560 | * 10/2000 |
| WO | WO 03/074445 A1 | 9/2003 |
| WO | WO 2005/068393 A1 | 7/2005 |

OTHER PUBLICATIONS

International Search Report dated Nov. 11, 2009 in International Patent Application No. PCT/FR2009/051141 (with translation).

* cited by examiner

*Primary Examiner* — Karl Group
(74) *Attorney, Agent, or Firm* — Oliff & Berridge, PLC

(57) ABSTRACT

Fused and cast refractory product including on oxides basis in percent by weight and for a total of 100%: $ZrO_2+HfO_2$ complement to 100%; 3.5% to 6.0% $SiO_2$; 0.7% to 1.5% $Al_2O_3$; 0.10% to 0.43% $Na_2O+K_2O$; 0.05% to 0.80% $B_2O_3$; less than 0.4% $CaO+SrO+MgO+ZnO$; less than 0.05% $P_2O_5$; less than 0.55% $Fe_2O_3+TiO_2$; less than 1.5% other species. The ratio of percentages by weight of $Al_2O_3/(Na_2O+K_2O)$ being greater than or equal to 3.5 and the ratio of percentages by weight of $B_2O_3/(Na_2O+K_2O)$ being between 0.3 and 2.5.

15 Claims, No Drawings

HIGH ZIRCONIA REFRACTORY MATERIAL

TECHNICAL DOMAIN

The invention relates to a new fused and cast refractory product with a high concentration of zirconia.

BACKGROUND OF THE INVENTION

Among refractory products, fused and cast products are well known for the fabrication of glass fusion furnaces and for sintered products.

As opposed to sintered products, the fused and cast products more often undergo an intergranular vitreous phase binding the crystallized grains. The problems posed by sintered products as well as fused and cast products and the technical solutions adopted to resolve such problems are generally different from one another. A composition developed to manufacture a sintered product is therefore, a priori, not readily usable to manufacture a fused and cast product and vice versa.

Fused and cast products, often referred to as electrocasts, are obtained by melting a mixture of appropriate raw materials in an electric arc furnace or by any other technique suited to these types of products. The molten material is then poured into a mold and the resulting product is subsequently subjected to a controlled cooling cycle with the objective of cooling the product down to room temperature without causing any fractures. This process is referred as "annealing" by professionals skilled in the art.

Among fused and cast products, electrocast products having a high concentration of zirconia, that is to say, comprising more than 85% zirconia ($ZrO_2$), are well known for their ability to resist corrosion without any coloration of the glass and without producing any defects.

Conventionally, fused and cast products having a high concentration of zirconia also include sodium oxide ($Na_2O$) in order to avoid the formation of zircon from the zirconia and silica present in the product. The formation of zircon is detrimental as it is accompanied by a reduction in volume of up to 20%, which creates certain mechanical constraints responsible for cracks.

Product ER-1195 produced and sold by Société Européenne des Produits Réfractaires and covered under patent EP-B-403 387 is currently widely used in glass furnaces. The chemical composition of this product is roughly 94% zirconia, 4 or 5% silica, approximately 1% alumina, 0.3% sodium oxide and less then 0.05% $P_2O_5$ by weight. This composition is typical of high concentration zirconia products used in glass furnaces.

FR 2 701 022 discloses fused and cast products having a high zirconia concentration which contain 7.0 to 11.2% $SiO_2$ by weight, 0.05 to 1% $P_2O_5$ by weight, 0.05 to 1.0% boric oxide $B_2O_3$ by weight and 0.01 à 0.12% of $Na_2O+K_2O$ by weight.

FR 2 723 583 describes fused and cast products having a high zirconia concentration which contain 3 to 8% $SiO_2$ by weight, 0.1 to 2% $Al_2O_3$ by weight, 0.05 to 3% boric oxide $B_2O_3$ by weight, 0.05 to 3% of $BaO+SrO+MgO$ by weight and 0.05 to 0.6% $Na_2O+K_2O$ by weight, and less than 0.3% of $Fe_2O_3+TiO_2$ by weight.

The creep of a material subjected to pressure (compression, tensile force or bending) may be defined as the capacity of the material to deform itself visco-plastically, that is to say, in a permanent manner under the influence of this load.

Current high quality glass development has increased the requisites concerning refractory products for glass fusion furnaces. In particular, there is a need for refractory products that present improved creep properties and/or resistance to thermal variations, or, more generally, products that present a better compromise between these two properties.

The object of the present invention is to satisfy this need.

SUMMARY OF THE INVENTION

In accordance with a first principal embodiment, the invention provides a fused and cast refractory product comprising, as a percentage by weight on oxides basis and for a total of 100%:

$ZrO_2+HfO_2$: complement to 100%
$SiO_2$: 3.5% à 6.0%
$Al_2O_3$: 0.7% à 1.5%
$Na_2O+K_2O$: 0.10% à 0.43%
$B_2O_3$: 0.05% à 0.80%
$CaO+SrO+MgO+ZnO$: <0.4%
$P_2O_5$: <0.05%
$Fe_2O_3+TiO_2$: <0.55%
other species: <1.5%, the ratio (A/N) of the percentages by weight $Al_2O_3/(Na_2O+K_2O)$ being greater than or equal to 3.5 and
the ratio (B/N) of the percentages weight $B_2O_3/(Na_2O+K_2O)$ being between 0.3 and 2.5.

As we shall see below, surprisingly, the refractory product, produced in accordance with the invention, presents excellent creep properties while maintaining its resistance to thermal variations.

Favorably, these creep properties allow, particularly with regards to blocks forming the walls of glass fusion furnaces' melting tanks, to accommodate the dimensions while not creating cracks during the startup of such glass fusion furnaces (increase in temperature under pressure).

Favorably, an increased resistance to thermal variations allows the manufacture of glass fusion furnaces which remain dimensionally stable over time despite the thermal variations caused by furnace shutdowns.

A refractory product produced according to one embodiment of the invention may also comprise one or several of the following optional characteristics, when such optional characteristics are made in accordance with the particular production methods described here-below and when such optional characteristics are not incompatible with the above-mentioned particular production methods.

- The percentage by weight of $ZrO_2+HfO_2$ is less than 95.65% or less than 95.4% or less than 95.3% or less than 95.2% or less than 95.0% or less than 94.5% and/or greater than 90.4% or greater than 91.0% or greater than 92.0% or greater than 93.0% or greater than 94.0%.
- The percentage by weight of alumina $Al_2O_3$ is equal to or less than 1.4%, or equal to or less than 1.3%.
- The percentage by weight of alumina $Al_2O_3$ is greater than or equal to 0.8%, or greater than or equal to 1.0% or greater than or equal to 1.1%.
- The ratio of percentages by weight (B/N) of $B_2O_3/(Na_2O+K_2O)$ is greater than 0.35, greater than 0.4, greater than 0.5, greater than 0.6, greater than 0.8, greater than 0.9, greater than 1.0, and/or less than or equal to 2.2, less than 2.0, less than 1.7, or less than 1.5.
- The ratio of percentages by weight (A/N) of $Al_2O_3/(Na_2O+K_2O)$ is greater than 4, preferably greater than 5, or greater than 6 and/or less than 10, or less than 8, or less than 7.5.
- $(Na_2O+K_2O)\geq0.15\%$ and/or $(Na_2O+K_2O)\leq0.40\%$, or $(Na_2O+K_2O)\leq0.30\%$, $B_2O_3 \geq 0.10\%$, or $B_2O_3 \geq 0.12\%$, or $B_2O_3 \geq 0.15\%$ and/or $B_2O_3 \leq 0.50\%$, $B_2O_3 \leq 0.40\%$, or $B_2O_3 \leq 0.30\%$.

Potassium oxide $K_2O$ is only present as an impurity and its percentage by weight is less than 0.2% or less than 0.1%.

The total percent by weight of "other species" is less than 1.0%, less than 0.6%, less than 0.5%, or less than 0.3%.

Iron oxide and/or titanium oxide and/or calcium oxide and/or strontium oxide and/or magnesium oxide and/or zinc oxide and/or phosphorus oxide are only present as impurities.

The total percentage by weight of calcium oxide and/or strontium oxide and/or magnesium oxide and/or zinc oxide, $CaO+SrO+MgO+ZnO$, is less than 0.3%, preferably 0.2%.

The percentage by weight of iron oxide and/or titanium oxide, $Fe_2O_3+TiO_2$, is less than 0.4%, preferably less than 0.3%, preferably less than 0.2%.

The "other species" are comprised solely of impurities.

The percentage by weight of "other species," whatever they may be, is always less than 0.4%, or less than 0.3%, preferably less than 0.2%

In accordance with a first preferred embodiment, the invention provides a fused and cast refractory product comprising, on oxides basis in percent by weight and for a total of 100%:
$ZrO_2+HfO_2$: complement to 100%
$SiO_2$: 3.5% to 6.0%
$Al_2O_3$: 0.7% to 1.5%
$Na_2O+K_2O$ 0.10% to 0.40%
$B_2O_3$: 0.05% to 0.80%
$CaO+SrO+MgO+ZnO$: <0.4%
$P_2O_5$: <0.05%
$Fe_2O_3+TiO_2$: <0.55%
other species: <1.5%
the ratio of percentages by weight (B/N) of $B_2O_3/(Na_2O+K_2O)$ being greater than 0.3, preferably greater than 0.35, preferably greater than 0.4, preferably greater than 0.5, or greater than 0.8, or greater than 1.0 and less than 2.5, less than 2.2, less than 2.0, or less than 1.5, and
the ratio of percentages by weight (A/N) of $Al_2O_3/(Na_2O+K_2O)$ being greater than 3.5, preferably greater than 4, or greater than 5, or greater than 6, and less than 15, less than 12, less than 10, less than 8, or less than 7.5.

Specifically, $Na_2O+K_2O \geq 0.15\%$ and/or $Na_2O+K_2O \leq 0.30\%$.

In accordance with a second particular embodiment, the invention provides a fused and cast refractory product comprising, on oxides basis in percent by weight and for a total of 100%:
$ZrO_2+HfO_2$: complement to 100%
$SiO_2$: 3.5% to 6.0%
$Al_2O_3$: 0.7% to 1.5%
$Na_2O+K_2O$: 0.10% to 0.43%
$B_2O_3$: 0.05% to 0.60%
$CaO+SrO+MgO+ZnO$: <0.4%
$P_2O_5$: <0.05%
$Fe_2O_3+TiO_2$: <0.55%
other species: <1.5%,
the ratio of percentages by weight (B/N) of $B_2O_3/(Na_2O+K_2O)$ being greater than 0.3, preferably greater than 0.35, preferably greater than 0.4, preferably greater than 0.5, or greater than 0.8, or greater than 1.0 and less than 2.5, less than 2.2, less than 2.0, or less than 1.5, and
the ratio of percentages by weight (A/N) of $Al_2O_3/(Na_2O+K_2O)$ being greater than 3.5, preferably greater than 4, or greater than 5, or greater than 6, and less than 15, less than 12, less than 10, less than 8, or less than 7.5.

Preferably, the percentage by weight composed of $B_2O_3$ is greater than or equal to 0.10%, or greater than or equal to 0.12%, or greater than or equal to 0.15%, and less than or equal to 0.50%, less than or equal to 0.40%, or less than or equal to 0.30%.

In accordance with a third particular embodiment, the invention provides a fused and cast refractory product comprising, on oxides basis in percent by weight and for a total of 100%:
$ZrO_2+HfO_2$: complement to 100%.
$SiO_2$: 3.5% to 6.0%
$Al_2O_3$: 1.1% to 1.5%
$Na_2O+K_2O$: 0.10% to 0.43%
$B_2O_3$: 0.05% to 0.80%
$CaO+SrO+MgO+ZnO$: <0.4%
$P_2O_5$: <0.05%
$Fe_2O_3+TiO_2$: <0.55%
other species: <1.5%,
the ratio of percentages by weight (A/N) of $Al_2O_3/(Na_2O+K_2O)$ being greater than 3.5, preferably greater than 4, or greater than 5, or greater than 6, and less than 15, less than 12, less than 10, less than 8, or less than 7.5, and
the ratio of percentages by weight (BIN) of $B_2O_3/(Na_2O+K_2O)$ being greater than 0.3, preferably greater than 0.35, preferably greater than 0.4, preferably greater than 0.5, or greater than 0.8, or greater than 1.0 and less than 2.5, less than 2.2, less than 2.0, or less than 1.5, and In certain embodiments, $(Na_2O+K_2O) \geq 0.15\%$, and preferably $(Na_2O+K_2O) \leq 0.40\%$, or even $(Na_2O+K_2O) \leq 0.30\%$.

In accordance with a fourth particular embodiment, the invention provides a fused and cast refractory product comprising, on oxides basis in percent by weight and for a total of 100%:
$ZrO_2+HfO_2$: complement to 100%.
$SiO_2$: 3.5% to 6.0%
$Al_2O_3$: 1.1% to 1.5%
$Na_2O+K_2O$: 0.10% to 0.40%
$B_2O_3$: 0.10% to 0.40%
$CaO+SrO+MgO+ZnO$: <0.4%
$P_2O_5$: <0.05%
$Fe_2O_3+TiO_2$: <0.55%
other species: <1.5%,
the ratio of percentages by weight $B_2O_3/(Na_2O+K_2O)$ being between 0.3 et 2.5, preferably between 0.4 et 2.2.

In one embodiment, $(Na_2O+K_2O) \geq 0.15\%$ and/or $(Na_2O+K_2O) \leq 0.30\%$.

In one embodiment, $B_2O_3 \geq 0.15\%$ and/or $B_2O_3 \leq 0.30\%$.

In accordance with a second particular embodiment, the invention provides a fused and cast refractory product comprising, on oxides basis in percent by weight and for a total of 100%:
$ZrO_2+HfO_2$: complement to 100%
$SiO_2$: 3.5% to 6.0%
$Al_2O_3$: 1.1% to 1.5%
$Na_2O+K_2O$: 0.10% to 0.43%
$B_2O_3$: 0.05% to 0.80%
$CaO+SrO+MgO+ZnO$: <0.4%
$P_2O_5$: <0.05%
$Fe_2O_3+TiO_2$: <0.55%
other species: <1.5%,
the ratio of percentages by weight of $B_2O_3/(Na_2O+K_2O)$ being between 0.3 et 2.5, preferably between 0.4 et 2.2.

In a particular embodiment, $(Na_2O+K_2O) \leq 0.40\%$.

The characteristics, either necessary or optional, of a product produced according to the first preferred embodiment of the invention may also be applied to a product made according to the second particular embodiment provided that such characteristics are not incompatible with such product.

Finally, the invention relates to a manufacturing procedure for a refractory product in accordance with the invention, including the following successive phases:
a) mixt of raw materials in order to obtain an initial charge,
b) melting of said initial charge until, getting of a molten material,
c) casting and solidification of said molten material, by cooling, in order to obtain a refractory product, this procedure being noteworthy insofar as the raw materials are chosen in such a manner that the resulting refractory product falls within the scope of invention.

Preferably, the oxides, of which there must be a minimum necessary concentration, specifically $Na_2O$, $Al_2O_3$ and $B_2O_3$, or precursors of these oxides, are systematically and methodically added. Preferably, the concentrations of these oxides within the sources of other oxides which are commonly considered as impurities are accounted for.

Preferably, the cooling phase is controlled, preferably so as to be performed at a rate of less than 20° C. per hour, preferably a rate of about 10° C. per hour.

The invention also relates to a glass fusion furnace comprising a refractory product in accordance with the invention, or a refractory product manufactured or likely to be manufactured following a procedure in accordance with the invention, in particular in regions intended to be in contact with fused glass. In a furnace made in accordance with the invention, the refractory product may favorably be a part of a preparatory tank for the fused glass, more specifically for electrical fusion, in which it is likely to come into contact with fused glass with temperatures exceeding 1200° C.

DEFINITIONS

The percentages by weight of oxides pertain to the global concentration for each of the corresponding chemical elements, expressed in the form of the most stable oxide pursuant to industry standards; included within this are any sub-oxides, possibly nitrides, carbides, oxicarbides, carbonitrides or even metallic species of the above-mentioned elements.

A "molten material" means a liquid mass which, in order to conserve its form, must be held in a container. This material may contain some solid particles but only in quantities that would be insufficient to give any structure to the mass.

"Impurities" means any inevitable constituents, involuntarily and necessarily introduced in connection with the raw materials or as a result of reactions between these constituents. Impurities are not necessary components, but are merely tolerated. For example, the compounds among the group of oxides, nitrides, oxinitrides, carbides, oxicarbides, carbonitrides and metallic species of iron, titanium, vanadium and chromium are impurities.

Unless otherwise stated, the entirety of the oxides contained in the products depicted and claimed are on oxides basis in percent by weight.

DETAILED DESCRIPTION OF THE INVENTION

In the fused and cast products according to the invention, the high concentration of zirconia $ZrO_2$ allows to meet the requirements of high resistance to corrosion without coloring the glass product nor generating defects that are detrimental to the quality of the glass.

Hafnium oxide, $HfO_2$, present in the product according to the invention is the hafnium oxide naturally present in the sources of zirconia. Its concentration in a product according to the invention is therefore less than or equal to 5%, generally less than or equal to 2%.

The presence of silica $SiO_2$ especially allows the formation of an intergranular glass phase apt to accommodate the volume variations of zirconia during its reversible allotropic transformation in an efficient manner, in other words during the passage from the monoclinic phase to the tetragonal phase. The percentage by weight of silica should be greater than 3.5%. On the other hand, the addition of silica should not exceed 6.0% as this addition is made to the detriment of the zirconia content and may, therefore, reduce corrosion resistance.

The presence of alumina $Al_2O_3$ is especially necessary for the formation of a stable glass phase and for the proper castability of the initial charge into the mold. It also contributes to obtain a very good resistance to thermal variations. Nevertheless, the addition of alumina should not exceed 1.5% as a higher percentage by weight may cause an instability in the glass phase (mullite crystal formation), in particular in the presence of boric oxide.

The presence of $Na_2O+K_2O$ in a percentage by weight greater than 0.10% contributes to increasing the level of resistance to thermal variations. It is preferable that the percentage by weight of $Na_2O$ not exceed 0.30% in order to obtain an elevated creep capacity. In a product according to the invention, it is considered that the oxides $Na_2O$ and $K_2O$ have similar effects.

The presence of $B_2O_3$ in a percentage by weight greater than 0.05% substantially increases the creep capacity. Nevertheless, the quantity of $B_2O_3$ should remain such that the ratio of $B_2O_3/(Na_2O+K_2O)$ is less than or equal to 2.5, preferably less than or equal to 2.2. Boric oxide has indeed an unfavorable effect as it facilitates the formation of zircon in the product. Beyond 0.30%, the resistance to thermal variations decreases. It remains, however, acceptable up to a percentage by weight of $B_2O_3$ of 0.80%.

According to the invention, the percentage by weight of $Fe_2O_3+TiO_2$ is less than 0.55% and that of $P_2O_5$ is less than 0.05%. Indeed, these oxides are known to be harmful and their content should be limited to trace impurities found in the raw materials.

The "other species" are the species which are not listed above, in other words, those which are not $ZrO_2$, $HfO2$, $SiO_2$, $Al_2O_3$, $Na_2O$, $K_2O$, $B_2O_3$, $CaO$, $SrO$, $MgO$, $ZnO$, $P_2O_5$, $Fe_2O_3$ et $TiO_2$. In an embodiment, the other species are limited to the species whose presence is not specifically desired and which are generally present as impurities in the raw materials.

In another embodiment, the "other species" may equally include some species whose presence is advantageous. For example, in one embodiment, the product advantageously comprises at least 0.05% of barium oxide BaO. This oxide may be an impurity or, if necessary, be voluntarily added in the initial charge. Its concentration is preferably less than 0.5%, in percent by weight on oxides basis.

A product, according to the invention, may be traditionally manufactured by the following steps a) to c) described below:
a) mix of raw materials in order to obtain an initial charge,
b) melting of said initial charge until obtaining a molten material,
c) Solidification of said molten material, by cooling, in a manner to obtain a refractory product according to the invention.

In step a), the raw materials are chosen in a way to guarantee the oxide contents in the finished product.

In step b), the melting is preferably done by the combined action of a sufficiently long electric arc, not producing any reduction, and stirring favoring the reoxidation of the products.

In order to minimize the formation of nodules having metallic aspects and to avoid the formation of cracks or fissures in the final product, it is preferable to perform the melting under oxidizing conditions.

Preferably, the process for melting with a long arc described in French patent no 1 208 577 and its additions no 75893 and 82310 is used.

This process consists of using an electric arc furnace in which the arc flows between the charge and at least one electrode separated from the charge and to adjust the length of the arc such that its reduction action is minimized, while maintaining an oxidizing atmosphere above the molten bath and while stirring said bath, either by the action of the arc itself, or by bubbling an oxidizing gas in the bath (air or oxygen, for example) or by adding oxygen releasing substances to the bath such as peroxides or nitrates.

In step c), the cooling is preferable performed at a rate less than 20° C. per hour, preferably at a rate of approximately 10° C. per hour.

Any conventional fabrication process for zirconia-based fused products intended for use in glass fusion furnaces may be used, provided that the initial charge composition allow to obtain products having a composition in accordance with a product according to the invention.

EXAMPLES

The following non-limiting examples are given in order to illustrate the invention.

In these examples, the following raw materials are used:
zirconia containing primarily, on a weight average, 98.5% $ZrO_2$+$HfO_2$, 0.2% $SiO_2$ and 0.02% $Na_2O$,
zircon sand having 33% silica,
type AC44 alumina sold by Pechiney and containing on average 99.4% alumina $Al_2O_3$,
oxides of boron and sodium having a purity of greater than 99%.

The products have been prepared pursuant to the conventional process of arc furnace melting then casting in order to obtain 220 mm×450 mm×150 mm blocks.

The chemical analysis of the resulting products is given in table 1; it is an average chemical analysis, given in percentage by weight.

In a creep test entitled "anisothermal," a flex test configuration of four pressure points is used (distance between exterior pressure points L=125 mm, distance between interior pressure points I=40 mm). A dimensions strip 25 mm×15 mm×150 mm is placed on the pressure points, then subject to a force of 1 MPa, the temperature being increased from the ambient temperature to 1500° C. at a rate of 30° C./hour. The variation of the arrow on the strip is recorded (in mm) during the entire test. In particular, the arrow is measured at the allotropic transformation of the zirconia and at 1400° C., and the DTz values are determined, equal to the percentage increase of the arrow after the allotropic transformation of the zirconia with respect to the arrow before the allotropic transformation of the zirconia, and D1400, equal to the percentage increase of the arrow at 1400° C. with respect to the arrow at the ambient temperature.

The ability to withstand thermal variations is determined with the help of a test consisting of subjecting a sample having dimensions 30 mm×30 mm×30 mm to 25 cycles between 800° C. et 1250° C. At each cycle, the sample is maintained for 1 hour at 800° C., the temperature is brought to 1250° C. in 1 hour and is maintained at this value for 1 hour. The value Vv indicated corresponds to the increase in volume, given in percent, between the beginning and the end of the trial.

In the following table 1, * indicates that the example is outside the scope of the invention, ND means <<Not Determined>>.

Example 1 corresponds to product ER1195 which constitutes the reference.

TABLE 1

|  | $SiO_2$ | $Na_2O$ | $Al_2O_3$ | $B_2O_3$ | A/N | B/N | DTz (%) | D1400 (%) | Vv (%) |
|---|---|---|---|---|---|---|---|---|---|
| 1* | 4.00 | 0.28 | 1.20 | 0.00 | 4.29 | 0.00 | 0.26 | 0.72 | 3.2 |
| 2* | 3.52 | 0.11 | 0.48 | 0.25 | 4.36 | 2.27 | 1.01 | 1.69 | 17 |
| 3* | 4.52 | 0.11 | 0.95 | 0.28 | 8.64 | 2.55 | ND | ND | 15 |
| 4* | 4.50 | <0.05 | 1.15 | 0.25 |  |  | ND | ND | 25.8 |
| 5* | 4.50 | 0.47 | 1.42 | 0.17 | 3.02 | 0.36 | 0.35 | ND | ND |
| 6 | 4.32 | 0.17 | 1.23 | 0.19 | 7.24 | 1.12 | 0.67 | 0.98 | 7 |
| 7 | 4.21 | 0.13 | 1.24 | 0.28 | 9.54 | 2.15 | 1.2 | 1.6 | 6 |
| 8 | 3.99 | 0.19 | 1.18 | 0.25 | 6.21 | 1.32 | 0.9 | ND | 6 |
| 9 | 4.10 | 0.30 | 1.10 | 0.13 | 3.67 | 0.43 | 1.28 | 1.53 | 4 |
| 10* | 4.50 | 0.13 | 1.15 | 0.40 | 8.85 | 3.08 | ND | ND | 35 |
| 11* | 4.18 | 0.12 | 1.02 | 0.40 | 8.50 | 3.33 | 1.07 | 1.54 | 23 |
| 12* | 4.30 | 0.07 | 0.65 | 0.17 | 9.29 | 2.43 | ND | ND | 16 |
| 13 | 5.24 | 0.10 | 1.04 | 0.24 | 10.4 | 2.40 | ND | ND | 6.3 |

The results show that the tested products of the invention present an excellent pattern of behavior. In particular, the creep is greater than 0.5% at the allotropic transformation temperature of the zirconia and the value Vv remains less than 10%. It is observed that the creep capacity of the products according to the invention is at least two times greater than that of the reference product (example 1).

Table 1 illustrates that the range of product compositions according to the invention is particularly narrow. In particular, a large sensitivity in the results is observed with respect to the evolution of alkaline metal oxides, boric oxide and alumina concentrations.

A comparison of examples 6 to 9 and 13 with example 4 shows the importance of the presence of a minimum quantity of alkaline metal oxides, in this case sodium oxide, in order to maintain an increased level of resistance to thermal variations.

A comparison of examples 6 to 9 and 13 with example 1 shows the importance of the presence of a minimum quantity of boric oxide in order to obtain increased creep capacity. A comparison of examples 6 to 9 and 13 with examples 3, and 11 shows however that this quantity should be limited in order to have a ratio (B/N) of percentages by weight $B_2O_3/(Na_2O+K_2O)$ less than 2.5 and to avoid a deterioration in the resistance to thermal variations.

A comparison of examples 6 to 9 and 13 with examples 2 and 12 show the importance of the presence of a minimum quantity of alumina in order to avoid a deterioration in the resistance to thermal variations.

Moreover, other tests have verified that products according to the invention also present the other recognized properties for materials having a high zirconia concentration, in particular the resistance to corrosion by the glass.

Of course, the present invention is not limited to those embodiments described and represented, which are supplied as non-limiting illustrative examples.

The invention claimed is:

1. A fused and cast refractory product comprising, on oxides basis in percent by weight and for a total of 100%:
   $ZrO_2+HfO_2$: complement to 100%
   $SiO_2$: 3.5% to 6.0%
   $Al_2O_3$: 0.7% to 1.5%
   $Na_2O+K_2O$: 0.10% to 0.43%
   $B_2O_3$: 0.05% to 0.80%
   $CaO+SrO+MgO+ZnO$: <0.4%
   $P_2O_5$: <0.05%
   $Fe_2O_3+TiO_2$: <0.55%
   other species: <1.5%,
   a ratio of percentages by weight of $Al_2O_3/(Na_2O+K_2O)$ being greater than or equal to 3.5 and
   a ratio of percentages by weight of $B_2O_3/(Na_2O+K_2O)$ being between 0.3 and 2.5.

2. The fused and cast refractory product according to claim 1, in which $Al_2O_3 \geq 1.1\%$.

3. A fused and cast refractory product comprising, on oxides basis in percentage by weight and for a total of 100%:
   $ZrO_2+HfO_2$: complement to 100%
   $SiO_2$: 3.5% to 6.0%
   $Al_2O_3$: 1.1% to 1.5%
   $Na_2O+K_2O$: 0.10% to 0.43%
   $B_2O_3$: 0.05% to 0.80%
   $CaO+SrO+MgO+ZnO$: <0.4%
   $P_2O_5$: <0.05%
   $Fe_2O_3+TiO_2$: <0.55%
   other species: <1.5%,
   a ratio of percentages by weight of $B_2O_3/(Na_2O+K_2O)$ being between 0.3 and 2.2.

4. The fused and cast refractory product according to claim 1, the ratio of percentages by weight of $B_2O_3/(Na_2O+K_2O)$ being greater than 0.5.

5. The fused and cast refractory product according to claim 1, the ratio of percentages by weight of $B_2O_3/(Na_2O+K_2O)$ being greater than 0.8.

6. The fused and cast refractory product according to claim 1, the ratio of percentages by weight of $B_2O_3/(Na_2O+K_2O)$ being greater than 1.0.

7. The fused and cast refractory product according to claim 1, the ratio of percentages by weight of $B_2O_3/(Na_2O+K_2O)$ being less than 2.2.

8. The fused and cast refractory product according to claim 1, the ratio of percentages by weight of $B_2O_3/(Na_2O+K_2O)$ being less than 1.5.

9. The fused and cast refractory product according to claim 1, where $(Na_2O+K_2O) \leq 0.40\%$ and/or $B_2O_3 \leq 0.60\%$.

10. The fused and cast refractory product according to claim 1, where $(Na_2O+K_2O) \leq 0.30\%$ and/or $B_2O_3 \leq 0.30\%$.

11. The fused and cast refractory product according to claim 1, where $(Na_2O+K_2O) \geq 0.15\%$ and/or $B_2O_3 \geq 0.15\%$.

12. The fused and cast refractory product according to claim 1, where the ratio of percentages by weight of $Al_2O_3/(Na_2O+K_2O)$ is greater than 6.

13. The fused and cast refractory product according to claim 1, where the total percentage by weight of the "other species" is less than 0.5%.

14. A glass fusion furnace comprising a refractory product according to claim 1.

15. The glass fusion furnace according to claim 1 claim 14, said refractory product being placed in a region intended to be in contact with molten glass at a temperature greater than 1200° C.

* * * * *